United States Patent Office 2,768,572
Patented Oct. 30, 1956

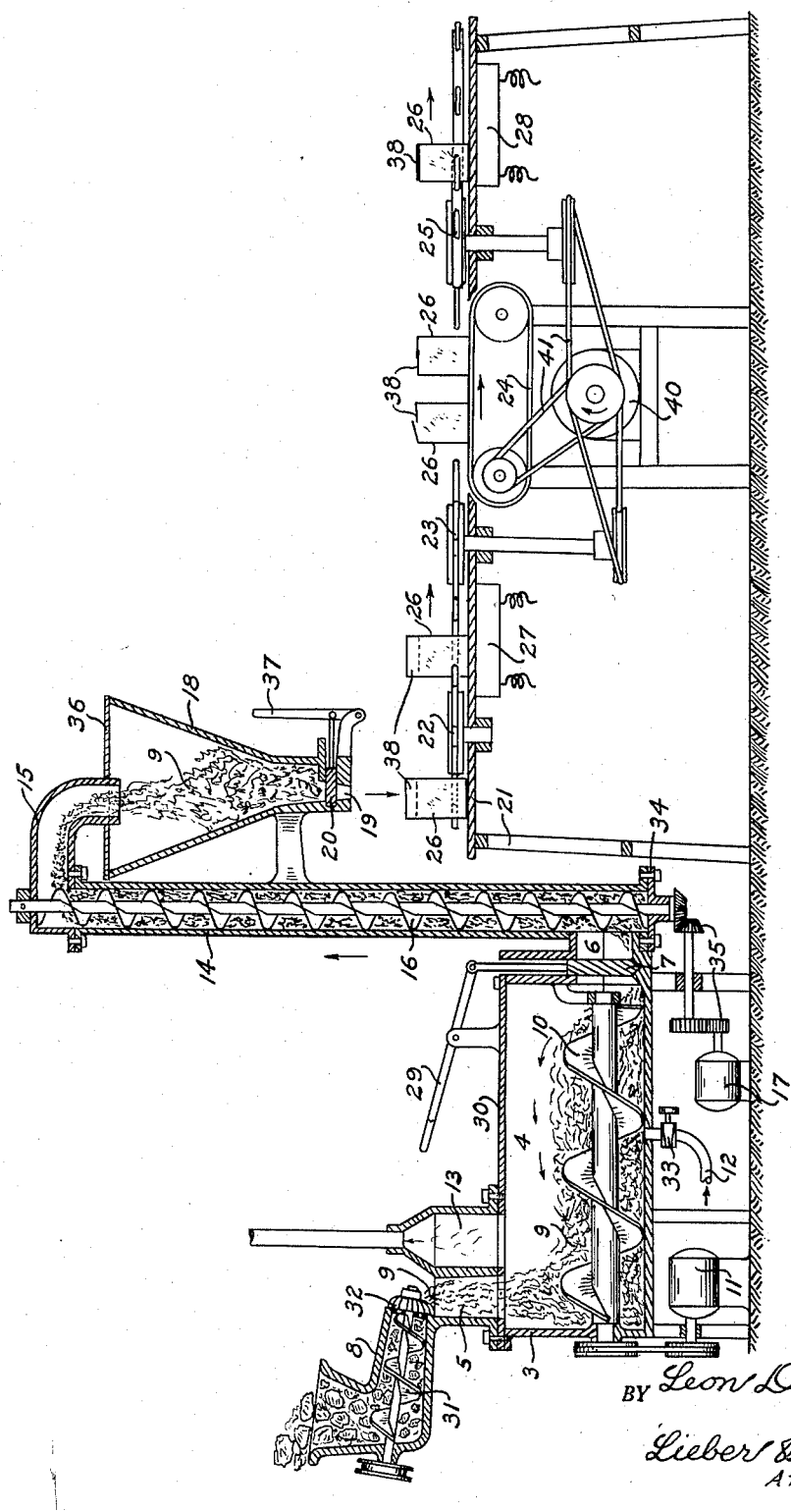

2,768,572

ART OF PROCESSING AND PACKAGING CHEESE

Leon Drangle, Gilman, Wis.

Application September 11, 1953, Serial No. 379,611

1 Claim. (Cl. 99—243)

The present invention relates in general to improvements in the art of processing and packaging commodities such as cheese, chocolate and other commodities of similar viscosity, and relates more specifically to an improved system and apparatus for facilitating the treatment and packing of cheese or the like in a confined space and in a manner whereby sterile final packages result.

It has heretofore been common commercial practice to grind and cook natural cheese and to thereafter pack small batches of the processed cheese in containers of various types, but in accordance with the prior procedure the cheese processing was invariably done in an upper story of the factory so that the treated product could be spouted by gravity into packing receptacles located in a lower story of the building. This procedure not only required a factory having several stories or superimposed floors, but also necessitated employment of considerable help in order to properly process and pack the commodity and to maintain the equipment in sanitary condition, thereby unduly increasing the cost of production of the final product. Then too, the prior systems of packing such processed cheese, did not insure effective sterilization so as to prevent mould formation at the package closures or seals, and furthermore were relatively slow and cumbersome to exploit.

It is therefore an important object of my present invention to provide an improved system for cooking natural cheese or the like, and for transporting the processed commodity away from the cooker to a packaging zone in a most effective and sanitary manner with the aid of simple apparatus capable of being housed in a single story of most any cheese factory.

Another important object of this invention is to provide a simple but highly sanitary mode of processing and packing natural cheese products in a manner whereby the packed commodity will be permanently preserved and mould formation definitely prevented.

A further important object of the invention is to provide simple, compact and highly efficient apparatus which may be readily operated and manipulated with minimum effort to rapidly treat and pack successive batches of cheese or the like.

Still another object of my invention is to provide an improved combination cheese batch cooking and elevating unit for vastly facilitating the processing and packaging of natural cheese by a minimum number of attendants and within limited space, and which may also be conveniently cleaned and actuated.

These and other more specific objects and advantages of the present improvement will be apparent from the following detailed description, from which it will be noted that the gist of my invention is the provision of a cheese processing and packaging system comprising a cooker for mixing and pasteurizing successive relatively large batches of ground natural cheese and having a controllable outlet at one end communicable directly with the lower end of an elevator the upper end of which has a delivery conduit directed downwardly into a hopper for confining a supply of the treated cheese and which is also provided with a controllable outlet, and a table located below the hopper outlet for positioning successive cartons having heat sealable closure flaps so as to receive small batches of the treated product from the storage hopper and being provided with heaters for sealing and sterilizing the closure flaps of the cheese laden cartons, all of the apparatus being adapted for installation within a single room of limited height.

A clear conception of the specific improvements constituting the present invention, and of the construction and operation of a commercial installation embodying the same, may be had by referring to the drawing accompanying and forming a part of this specification and wherein the various parts are designated by suitable reference characters.

The single figure of the drawing is a relatively diagrammatic and part sectional side elevation of the apparatus involved in the improved system of processing and packaging cheese, showing the same in action.

While the invention has been illustrated and described herein as being advantageously applicable to a system for processing and packaging natural cheddar cheese which is disintegrated by a grinder associated directly with the cooker, it is not my desire or intention to unnecessarily restrict the utility of the improved features by virtue of this limited showing; and it is also contemplated that specific descriptive terms employed herein be given the broadest possible interpretation consistent with the disclosure.

Referring to the drawing, the improved cheese treating and packing system shown, comprises in general, an elongated horizontal cooker casing 3 forming an enclosed cheese processing chamber 4 having an upper inlet 5 at one end and a lower outlet 6 at its opposite end controllable by means of a gate valve 7; a cheese disintegrator or grinder 8 adapted to deposit ground cheese 9 into the chamber 4 through the inlet 5; an agitating, mixing and conveying rotor 10 revolvable within the chamber 4 by an electric motor 11; a valve controlled steam supply pipe 12 for delivering heating fluid into the medial portion of the bottom of the chamber 4, and a vapor escape dome 13 for the spent steam associated with the top of the processing chamber; an elevator having an elongated upwardly directed tubular casing 14 communicating at its lower extremity with the cooking chamber outlet 6 while its upper end communicates with a downwardly directed delivery spout 15 and its interior is provided with a revolvable conveyor screw 16 adapted to be rotated by another electric motor 17; a receptacle or hopper 18 for receiving and confining a supply of treated cheese 9 from the spout 15 and having a lower outlet 19 controllable by means of a slide valve 20; and a loading table 21 located under the hopper 18 and having thereon a series of conveyors 22, 23, 24, 25 for transporting successive containers 26 from beneath the hopper outlet 19 past several heat sealers 27, 28 also carried by the table 21.

The cooker is of rather standard construction and is adapted to treat relatively large successive batches of the cheese 9 whenever the gate valve 7 is closed, and this control valve 7 may be opened periodically with the aid of a lever 29 so as to deliver the treated batches directly to the elevator casing 14. The cooker casing 3 is preferably provided with a removable cover 30 for permitting convenient access to the chamber 4 for cleaning and sterilizing purposes, and the cheese grinder 8 may be of any suitable type having a grinding and conveying rotor 31 and a rotary cutter 32 adapted to be revolved in any convenient manner. The cooker rotor 10 which is revolvable within the chamber 4 by means of the motor 11, is formed to thoroughly agitate and work each batch of cheese 9 while confined in the treating zone, and to also convey the processed batches toward the elevator whenever the gate valve 7 is opened, and the delivery of steam to the chamber 4 may be controlled by means of a valve 33 in the supply pipe 12.

The elevator which communicates directly with the outlet 6 of the processing chamber 4 past the gate valve 7, and which is adapted to elevate the treated cheese 9 to substantially room height, is an important feature of the present invention since it permits the entire treating and packaging installation to be disposed within one story of a building of relatively short length. The conveyor screw 16 of this elevator is confined within the tubular casing 14 by a lower removable end head 34 and by the upper detachable delivery spout 15, in such manner that the screw may be readily removed for cleaning and sterilizing purposes, and the elevator screw 16 may be rotated at will by means of the motor 17 coacting with the screw shaft through gearing 35.

The cheese storage hopper 18 which is adapted to receive treated cheese 9 from the elevator casing 14 through the spout 15, may be supported from the elevator casing 14 and is preferably provided with a removable cover 36 so that the cheese 9 after being admitted to the chamber 4 is substantially sealed from exposure to the atmosphere until it discharged in relatively small batches from the hopper 18 through the opening 19. The slide valve 20 is operable by means of a lever 37, and all of the surfaces of the cooker, elevator and hopper 18 with which the cheese 9 is brought in contact, are preferably formed of stainless steel or provided with non-corrosive smooth coatings which may be easily cleaned and sterilized.

The packaging table 21 is of such height that an attendant may readily manipulate the cartons or containers 26 applied thereto and which are transported therealong, and these containers are preferably of the type having heat sealable flaps 38 at their opposite ends adapted to be overlapped and sealed by the application of heat and slight pressure. Each of these containers 26 may initially be set up in upright position with the flaps 38 at the lower end thereof loosely overlapping and those at its upper end open, at the end of the table 21 beneath the hopper outlet 19, in order to receive a batch of the treated cheese 9, and the first conveyor 22 is provided with advancing peripheral hooks adapted to transfer the successive commodity laden containers 26 over the first heater 27 in order to seal their lower ends and to sterilize the cheese 9 at the closures.

The heaters 27, 28 may be electrically energized, and the conveyors 22, 23, 25 may be of the endless chain or sprocket type having container transporting hooks, while the conveyor 24 is of the endless belt type, all of which are well known in the packaging art. All of these conveyors 22, 23, 24, 25 may be simultaneously operated by a common electric motor 40 through pulleys and belts 41, and the upper run of the endless belt conveyor 24 is adapted to travel between the conveyors 23, 25 substantially in the plane of the table top. The initial conveyor 22 is adapted to be operated by the second conveyor 23, and the upper run of the belt conveyor 24 serves as a reversing or inverting zone for the successive cheese laden containers 26 as will be subsequently explained, while the second heater 28 is adapted to seal the flaps 38 at the opposite ends of the loaded containers 26 after inversion thereof and while they are being transported away from the inverting zone by the conveyor 25.

When the apparatus has been properly assembled as above described, it may be operated to systematically process the cheese 9 and to pack batches thereof in the successive containers 26 in the following manner. With the valve 7 closed, the natural cheese after being reduced in the grinder 8 is deposited within the cooking zone or chamber 4 through the cooker inlet 5 while the agitating rotor 10 is being revolved and steam is being admitted through the supply pipe 12, until a relatively large batch of the commodity has been admitted. The revolution of the rotor 10 and the steam admission is then continued until the entire batch of cheese has been properly cooked and sterilized; and the formation of the rotor 10 is such that thorough kneading and mixing of the cheese and heating fluid is assured, as indicated by the arrows within the chamber 4.

When the cheese batch confined within the chamber 4 has been properly processed, the elevator may be operated and the gate valve 7 should be opened, whereupon the rotor 10 will convey the treated cheese mass from within the treating chamber through the outlet 6 into the lower end of the elevator casing 14. The revolving elevator screw 16 will then quickly lift a constant stream of the cooked cheese 9, and will transfer the same into the upper spout 15 from which the treated material gravitates into the enclosed hopper 18. After all of the treated cheese batch has been thus transferred by the elevator from the chamber 4 to the storage hopper 18, the gate valve 7 may again be closed and fresh cheese 9 may be admitted to the cooking zone for subsequent processing.

The attendant stationed at the side of the table 21, should then proceed to pack the treated cheese in the containers 26 by setting the successive cartons with their lower flaps 38 loosely overlapped upon the table tops in vertical alinement with and beneath the hopper outlet 19 and by opening the slide valve 20 to permit the fluent cheese to descend and fill each container. The successive cheese laden containers 26 will then be transported by the first conveyor 22 over the initial heater 27 to heat seal the overlapped lower flaps 38 thereof, and as the bottom sealed cheese filled cartons are advanced by the second conveyor 23 toward the endless belt conveyor 24, the attendant should loosely overlap the upper closure flaps 38 and should deposit each container in inverted position upon the upper advancing run of the conveyor 24.

The inverted and filled containers 26 will thereafter be delivered in succession by the belt conveyor 24 to the conveyor 25 which transports the containers over the second heater 28 which heat seals the overlapping flaps 38 at the lower ends of the cartons, and the final packages may either be removed from the table 21 by hand or with the aid of other conveying mechanism. The heat sealing of the flaps 38 at the opposite ends of each container 38 not only serves to thoroughly enclose each batch of processed cheese 9, but also sterilizes the closures so as to prevent possible subsequent mould formation, and the entire processing and packing system can be installed in a single story of the factory and operated by a single attendant if so desired. Whenever operation of the system is discontinued, the apparatus should all be thoroughly cleaned and sterilized preparatory to subsequent operation.

From the foregoing detailed description of the construction and operation of the improved cheese processing and packaging system, it will be apparent that the present invention provides a method which can be commercially exploited with simple and compact equipment and with minimum labor to produce sterile final cheese packages in rapid succession. While the grinder, cooker and final conveyors are all relatively standard equipment, the provision of the elevator directly at the delivery end of the cooking chamber 4 is of considerable importance in order to facilitate exploitation of the system with few attendants, and to permit installation of the apparatus in minimum quarters. The provision of the heat sealers or heaters 27, 28 associated with the container inverting zone is also very important in order to insure thorough sterilization of the carton closures, and the invention has proved highly satisfactory and successful in actual commerical use.

It should be understood that it is not desired to limit this invention to the exact details of construction and operation of the cheese processing and packaging apparatus, herein shown and described, for various modifications within the scope of the appended claims may occur to persons skilled in the art.

I claim:

In a cheese processing and packaging system, an elongated horizontal casing forming a processing chamber having an upper inlet for ground cheese at one end and a lower outlet for processed cheese at its opposite end controllable by a valve, a cheese mixing and conveying rotor revolvable within the lower portion of said chamber and extending from said inlet to said outlet, means for introducing heating fluid into the lower medial portion of said chamber and for delivering vapor from the top of said chamber near said cheese inlet, a vertical cheese elevator sealingly communicable at its lower extremity directly with said chamber outlet past said valve and having an upright screw conveyor sealed from the ambient atmosphere for elevating processed cheese received from the outlet far above the top of said casing, a hopper having its upper end sealingly communicable directly with the upper extremity of said elevator and also having a lower controllable outlet for delivering processed cheese downwardly by gravity, means for conducting heat sealable open ended receptacles directly beneath and in close proximity to said hopper outlet with their lower ends closed and their upper open ends facing the hopper outlet, and means for subsequently simultaneously heat sealing and sterilizing said receptacle ends.

References Cited in the file of this patent

UNITED STATES PATENTS

| | | |
|---|---|---|
| 1,861,721 | Scott | June 7, 1932 |
| 1,862,563 | Bell | June 14, 1932 |
| 1,997,301 | Kniffen et al. | Apr. 9, 1935 |
| 2,014,555 | Chekian | Sept. 17, 1935 |
| 2,361,775 | Kraft | Oct. 31, 1944 |
| 2,471,867 | Fisher et al. | May 31, 1949 |
| 2,602,498 | Overton | July 8, 1952 |